United States Patent
Kaiser et al.

(10) Patent No.: US 7,134,345 B2
(45) Date of Patent: Nov. 14, 2006

(54) PRESSURE TRANSDUCER WITH ONE-PIECE HOUSING

(75) Inventors: Ralf Kaiser, Unterbruenden (DE); Ralf Goetze, Dietzhausen (DE); Christian Roesser, Grossbottwar-Winzerhausen (DE); Heiko Rausch, Gerstungen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/999,707

(22) Filed: Nov. 29, 2004

(65) Prior Publication Data
US 2005/0139008 A1 Jun. 30, 2005

(30) Foreign Application Priority Data
Dec. 29, 2003 (DE) .................. 103 61 769

(51) Int. Cl.
*G01L 7/08* (2006.01)
(52) U.S. Cl. ...................................... 73/715
(58) Field of Classification Search ........... 73/718, 73/724, 717, 715; 264/109, 621; 361/283.4; 438/53
See application file for complete search history.

(56) References Cited

U.S. PATENT DOCUMENTS
6,167,761 B1 * 1/2001 Hanzawa et al. .......... 73/724
6,328,918 B1 * 12/2001 Schoonover et al. ...... 264/109

FOREIGN PATENT DOCUMENTS
DE 100 14 992 10/2001

* cited by examiner

*Primary Examiner*—Jewel Thompson
(74) *Attorney, Agent, or Firm*—Kenyon & Kenyon LLP

(57) ABSTRACT

A method for manufacturing a pressure sensor having a pressure transducer, a pressure-measuring cell having a pressurizable diaphragm as well as a transducer body. The transducer body is manufactured in one piece by a metal powder injection molding process and a subsequent sintering process. Further, a pressure sensor manufactured by the method.

13 Claims, 4 Drawing Sheets (Y)

(Z)

PRESSURE TRANSDUCER WITH ONE-PIECE HOUSING

FIELD OF THE INVENTION

For controlling or regulating numerous technical processes it is necessary to measure pressure. In many cases this is done with the aid of pressure sensors. Such a pressure sensor includes a pressure transducer equipped with a diaphragm that is deformed as a function of the pressure. To avoid leakage at the pressure transducers it is necessary that the pressure transducer housing is constructed in a pressure-tight manner.

BACKGROUND INFORMATION

In the case of pressure sensors as used according to the related art, the housing of the pressure transducer is constructed from multiple parts. The individual housing parts are mainly manufactured using a metal-cutting process. Subsequently, the housing parts are welded together in a pressure-tight manner. Here a pressure-stable bond between the individual parts is required, particularly for applications in the high-pressure range. Already the smallest flaws in the weld will result in losses due to leakage and in errors in the measurement of pressure.

A sensor system for measuring pressure is described in German Patent Application No. DE 100 14 992. In this case, the sensor system includes a pressure-measuring cell featuring a measuring diaphragm that can be deflected by the pressurized measuring medium. A measuring bridge directly attached to the measuring diaphragm functions as the sensor circuit. An evaluation circuit is provided in the form of a hybrid circuit and can be attached directly to the measuring diaphragm by establishing electrical connections between the hybrid circuit and the sensor circuit and a measuring connection to the housing of the sensor system. The housing of the sensor system has a multipart design, and the contacting of the connector terminals of the hybrid circuit to the connector pins of the unit connector can be effected using pressure contacts.

The housings known from the related art have the particular disadvantage that the individual housing parts must be manufactured very precisely so that they can be joined together in a pressure-tight manner. An appropriately precise metal-cutting manufacture is bound up with high costs. A high expense is also required for quality control since each individual part must be visually inspected.

SUMMARY OF THE INVENTION

A pressure sensor designed according to the present invention includes a pressure transducer having a one-piece housing. The housing of the pressure transducer is preferably manufactured using a metal powder injection molding process and a subsequent sintering process.

In a preferred specific embodiment, the measuring cell with the sensor diaphragm is accommodated in an additional insert. In the manufacture of the pressure transducer housing, the insert preferably has pressure-tight injection molding applied around it and is sintered into the housing. This achieves a pressure-tight, rigid connection between the insert and the housing of the pressure transducer. Injection molding around the insert and sintering the insert into the housing of the pressure transducer has the result that no leakage can occur at the joint between the insert and the housing.

In a further especially preferred specific embodiment, the measuring cell is accommodated directly in the housing of the pressure transducer. For this purpose, the pressure-measuring diaphragm is formed in one piece with the housing of the pressure transducer in the metal powder injection molding process and the subsequent sintering process. The one-piece manufacture of the sensor diaphragm and the pressure transducer housing allows for a pressure-tight and stable bond between the diaphragm and the housing.

The transducer body according to the present invention features a through-hole, which is open towards the pressurized medium so that the pressurized medium can flow into the through-hole. The other side of the through-hole is sealed by the measuring diaphragm. The pressurized medium is thereby applied to one side of the measuring diaphragm. The one-sided application of the pressurized medium to the measuring diaphragm results in the elastic deformation of the measuring diaphragm. To measure the pressure, the elastic deformation of the measuring diaphragm is ascertained. The deformation can be used to infer the pressure of the medium.

With the aid of an exterior thread on the transducer body, the pressure transducer can be installed in a wall of a body filled with pressurized medium. The body filled with pressurized medium can be a tube, for example, through which the pressurized medium flows, or a container filled with the medium.

In a further preferred specific embodiment, the transducer body is configured with a hexagonal flange, which can be used to screw the pressure transducer into the wall of the body filled with pressurized medium using a wrench or a comparable device as is known to one skilled in the art.

DETAILED DESCRIPTION

Figure 1:
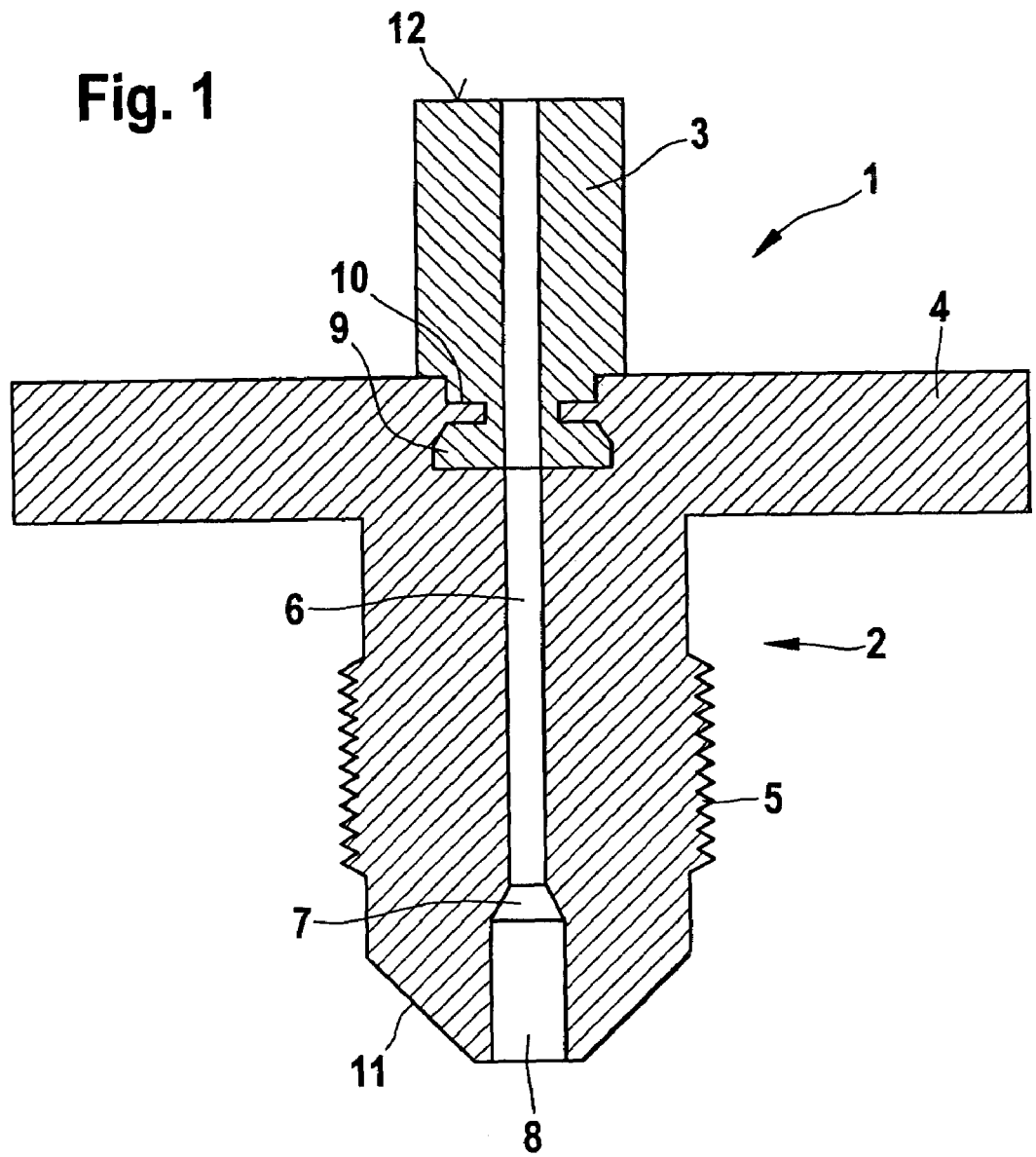
FIG. 1 shows a cross-section of a pressure transducer according to the present invention including insert.

FIG. 1 shows a pressure transducer with insert as can be used for pressure sensors having a measuring range up to 300 bar.

A pressure transducer 1, as shown in FIG. 1, includes a transducer body 2 and an insert 3. Transducer body 2 of pressure transducer 1 is preferably manufactured by a metal powder injection molding process. Insert 3 in the specific embodiment shown in FIG. 1 has an enlargement 9, which preferably has the shape of a cone. Above enlargement 9, insert 3 has a groove 10. Insert 3 is fixed in position in transducer body 2 with the aid of enlargement 9 and groove 10.

In the manufacture of pressure transducer 1, ready-made insert 3, which is preferably made of Invar, an iron-nickel alloy having a low thermal expansion value, or of brass, is inserted into the die mold for manufacturing transducer body 2. A mixture of a metal powder, binding agent and plastifier is injection-molded into the die mold. Following the injection molding, the binding agent is expelled from transducer body 2 preferably by rinsing with acetone.

Following the expulsion of the binding agent, transducer body 2 is sintered. In the process, residual binding agent is evaporated as well. The sintering process achieves a reducible manufacturing quality of transducer body 2 manufactured by the metal powder injection molding process. Finally, the sintering process can be followed by additional refining processes such as heat treatment for example.

Transducer body 2 has an external thread 5 that can be used to attach pressure transducer 1 for example in a wall of a pipe through which a pressurized medium flows or in a wall of a container which is filled with pressurized medium. The hexagonal flange 4 also formed on transducer body 2 can be used to screw pressure transducer 1 into the wall using a wrench for example. External thread 5 is preferably formed during the injection molding process.

Transducer body 2 has a bore hole 8, which via a conical narrowing 7 passes over into a through-hole 6. The geometry of bore hole 8, conical narrowing 7 and through-hole 6 depends on the use of pressure transducer 1. Thus when using pressure transducer 1 in a high-pressure accumulator of internal combustion engines, for example, bore hole 8 for connecting and sealing pressure transducer 1 to the high-pressure accumulator has a greater diameter than through-hole 6.

Through-hole 6 likewise goes through insert 3. For measuring pressure, a pressure-measuring cell, not shown here, containing a pressure-measuring diaphragm, is installed on an upper face 12 of insert 3. The connection between the pressure-measuring cell and insert 3 preferably occurs in a form-locking manner, for example by welding, anodized bonding, soldering or gluing.

On the side lying across from insert 3, transducer body 2 has a cone 11. Cone 11 results in an improved stress distribution in transducer body 2 when pressure is applied. In this manner, stress peaks are avoided in transducer body 2. This improves the stability of transducer body 2.

Figure 2:
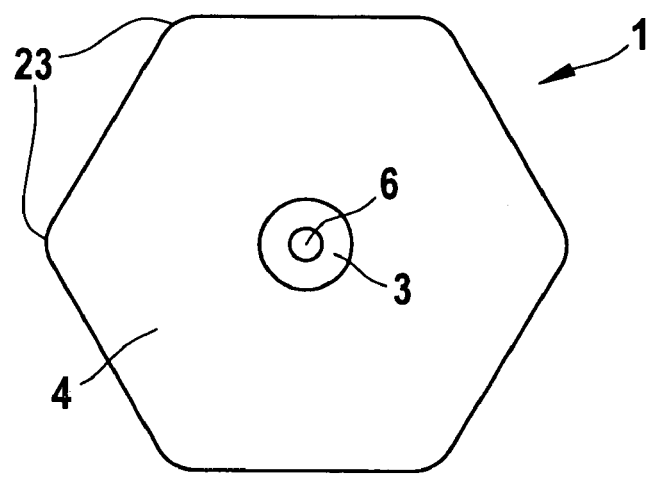
FIG. 2 shows a top view of the pressure transducer according to FIG. 1.

FIG. 2 shows a top view of a pressure transducer according to FIG. 1.

Insert 3 with through-hole 6 is preferably arranged concentrically with respect to hexagonal flange 4. This facilitates screwing in pressure transducer 1 using a screw tool. For improving the stress distribution when screwing in pressure transducer 1, the corners of hexagonal flange 4 preferably take the form of rounded corners 23. The maximum tightening torque with which pressure transducer 1 is screwed in is for example 100 Nm for an external thread 5 of M12 or M18.

Figure 3:
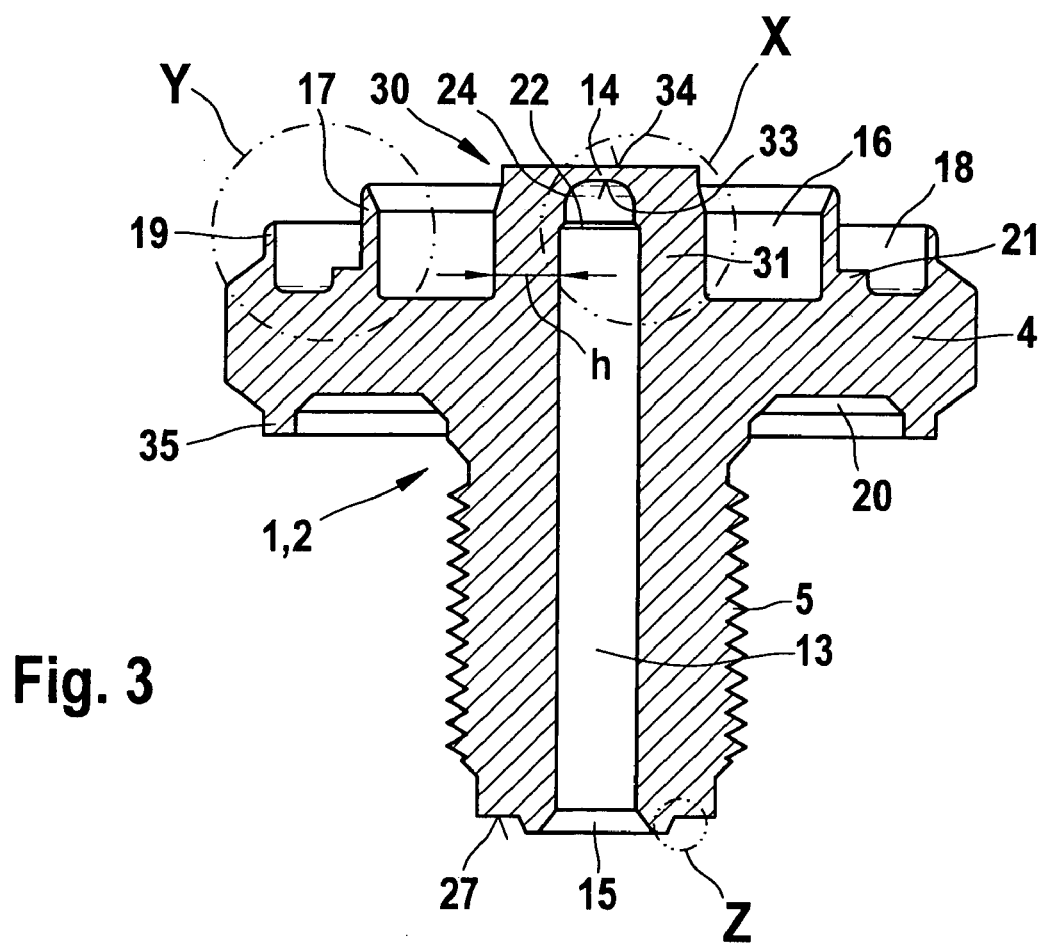
FIG. 3 shows a cross-section of a pressure transducer including the measuring cell accommodated in the housing.

FIG. 3 shows a pressure transducer having an integrated pressure-measuring cell for applications up to 2000 bar.

In the specific embodiment shown in FIG. 3, pressure transducer 1 is formed of one piece with a pressure-measuring cell 30. An important feature of pressure-measuring cell 30 is a diaphragm 14, which seals a bore hole 13 accommodated in a centered position in transducer body 2. Bore hole 13 is open on the side lying across from diaphragm 14. Pressurized medium flows into bore hole 13 via the open end of bore hole 13. As a result, the pressure of the medium is applied to a diaphragm surface 33 of diaphragm 14 facing bore hole 13. An outer diaphragm surface 34 of diaphragm 14 lying across from the diaphragm surface is facing the environment and thus has constant ambient pressure acting on it, which is preferably lower than the pressure of the medium in bore hole 13. Due to the difference in pressure applied to diaphragm 14, diaphragm 14 is deformed. The pressure of the medium in bore hole 13 is ascertained on the basis of the deformation of diaphragm 14. To prevent stresses in transducer body 2, a chamfer 15 is formed at the open end of bore hole 13.

Pressure transducer 1 is fastened by screwing transducer body 2 into a wall of a pipe through which a pressurized medium flows or into the wall of a container which is filled with pressurized medium. Transducer body 2 is preferably screwed into the wall with the aid of a wrench or a corresponding tool known to one skilled in the art. For this purpose, transducer body 2 is configured with a hexagonal flange 4. On the side facing diaphragm 14, a first annular groove 16 bounded by a first annular rib 17 is formed on hexagonal flange 4. First annular rib 17 is followed by a second annular groove 18 and a second annular rib 19. First annular rib 17 has a step 21 in the direction of second annular groove 18. Second annular groove 18 is used to accommodate a unit connector that is not shown here. To seal the joint between transducer body 2 and the unit connector not shown here, a sealing ring is preferably positioned on step 21. The sealing ring is thus clamped between the unit connector and first annular rib 17.

In addition to diaphragm 14, pressure-measuring cell 30 includes a side wall 31 surrounding bore hole 13. Along a radius 24, side wall 31 passes over into diaphragm 14 situated orthogonally with respect to side wall 31. The wall thickness h of side wall 31 is chosen in such a way that an application of pressure to side wall 31 via bore hole 14 does not result in a deformation of sidewall 31. To this end, the wall thickness is preferably greater than 2 mm.

In addition to the specific embodiment as shown in FIG. 3, in which pressure transducer 1 is not configured with a cone on bottom face 27, a cone 11 may be formed on bottom face 27 depending on the installation type of the pressure transducer and the associated sealing mechanism, as shown in FIG. 1.

The bottom face of hexagonal flange 4 preferably has an annular groove 20. A support 35 is thereby formed, which runs along the edge of hexagonal flange 4. When pressure transducer 1 is inserted into a wall, support 35 together with the wall forms a peripheral, continuous line of contact, which acts as an additional seal.

As shown in FIG. 3, transducer body 2 of pressure transducer 1 is preferably manufactured using a metal injection molding process. To this end, first a metal powder is mixed with a binding agent and a plastifier. This mixture is injected under high pressure into a mold using an injection molding machine as known to one skilled in the art. Preferably by rinsing with acetone, the binding agent is expelled from transducer body 2 thus produced by the metal powder injection molding process. Subsequently, transducer body 2 produced by the metal powder injection molding process is brought into the final form of the appropriate quality using a sintering process. Particularly high-tensile high-grade steel or iron-containing metal alloys are suitable materials for the metal powder injection molding process.

Figure 4:
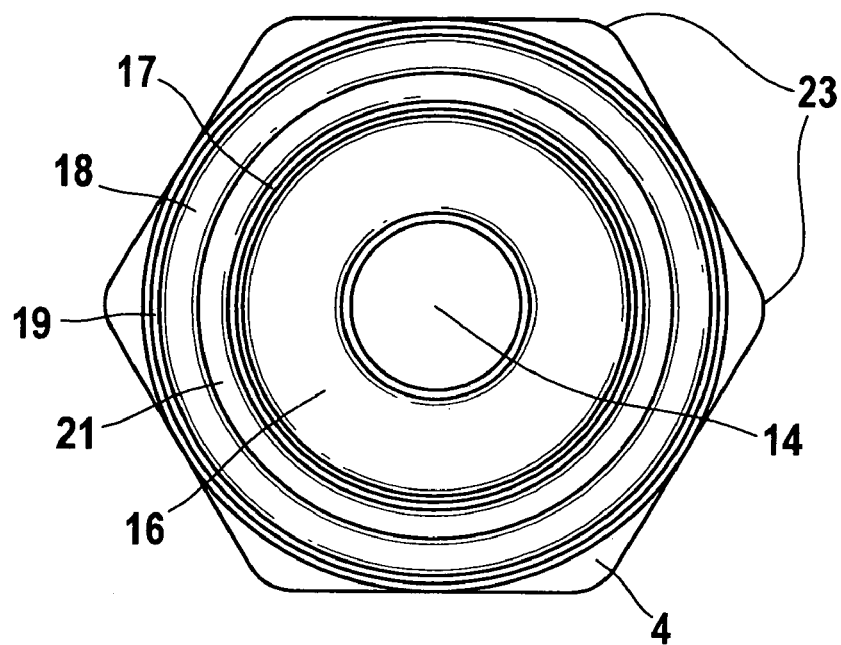
FIG. 4 shows a top view of the pressure transducer according to FIG. 3.

FIG. 4 shows a top view of the pressure transducer represented in FIG. 3. In this specific embodiment, corners 23 of hexagonal flange 4 are also rounded to prevent stresses. FIG. 4 shows that diaphragm 14, first annular groove 16, first annular rib 17, second annular grove 18 and second annular rib 19 are arranged concentrically. First annular rib 17 is followed by step 21 in the direction of second annular groove 18.

Figure 5:
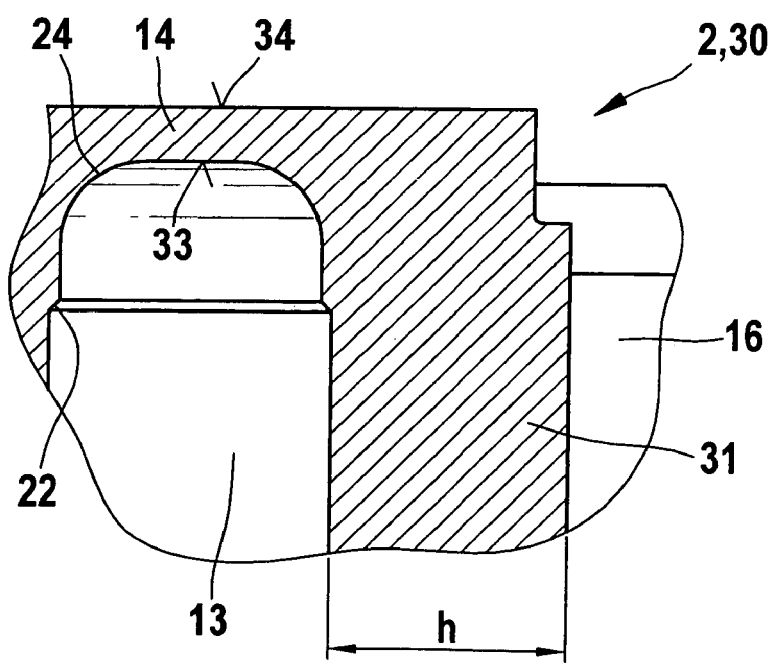
FIG. 5 shows detail X of the pressure transducer according to FIG. 3.

FIG. 5 shows the detail marked by X in FIG. 3.

Here it can be seen that the transition from side wall 31 of pressure-measuring cell 30 to diaphragm 14 takes the form of radius 24. Here too, radius 24 achieves a uniform stress distribution in transducer body 2 in case of a one-sided application of pressure from the interior via bore hole 13. The uniform stress distribution results in a lower material strain in transducer body 2. This can increase the service life of pressure transducer 1. Below radius 24, bore hole 13 features a chamfer 22. Chamfer 22 marks the transition region to the dimensionally accurate manufacture of pressure-measuring cell 30.

Figure 6:
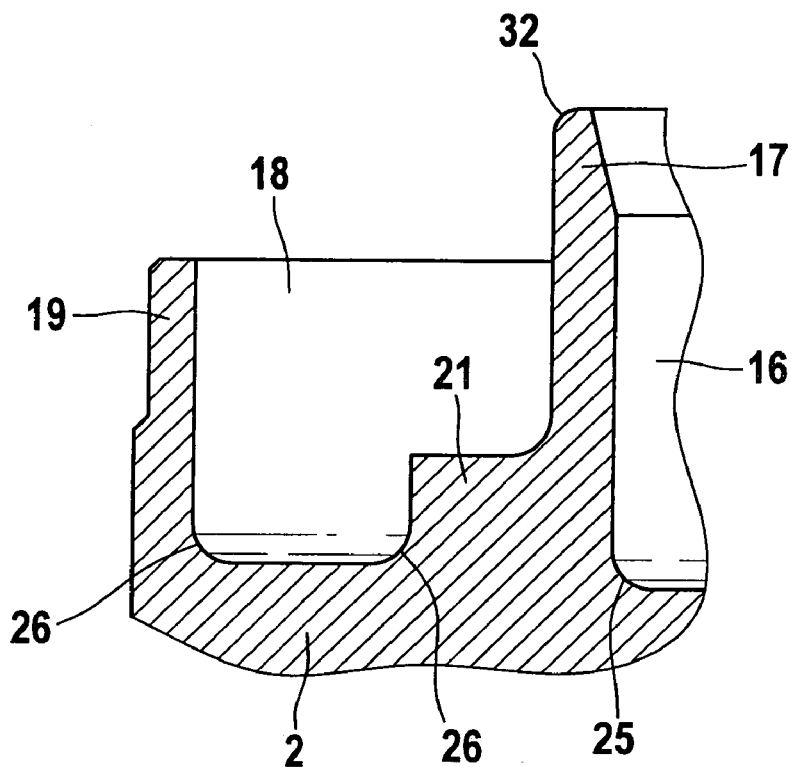
FIG. 6 shows detail Y of the pressure transducer according to FIG. 3.

FIG. 6 shows the detail indicated by Y in FIG. 3. Here too, first annular groove 16 has a transitional radius 25 and second annular groove 18 has a transitional radius 26 for distributing stress evenly when pressure is applied to pressure transducer 1. A step 21 is situated in the direction of second annular groove 18 at first annular rib 17 between first annular groove 16 and second annular groove 18. Second annular groove 18 is formed by first annular rib 17 and second annular rib 19. Second annular groove 18 bounded by first annular rib 17 and second annular rib 19 is designed to accommodate a housing (unit) connector. The housing connector is sealed and the attachment of the housing connector is additionally secured by a seal that is installed on step 21 between the housing connector and the first annular rib 17. To facilitate the installation of the seal that is preferably designed as an O-ring, first annular rib 17 has a radius 32 on the side facing step 21.

Figure 7:
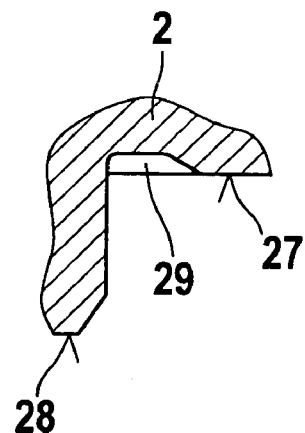
FIG. 7 shows detail Z of the pressure transducer according to FIG. 3.

FIG. 7 shows the detail marked by Z in FIG. 3. At its bottom face 27, transducer body 2 has a projection 28. Projection 28 surrounds the opening to bore hole 13 (cf. FIG. 3). In a preferred specific embodiment, an annular groove 29 for accommodating a sealing ring is formed at the transition from projection 28 to bottom face 27. The cross section of annular groove 29 preferably has the form of a segment of a circle.

LIST OF REFERENCE NUMERALS

1 Pressure transducer
2 Transducer body
3 Insert
4 Hexagonal flange
5 External thread
6 Through-hole
7 Conical narrowing
8 Bore hole
9 Enlargement
10 Groove
11 Cone
12 Upper face
13 Bore hole
14 Diaphragm
15 Chamfer
16 First annular groove
17 First annular rib
18 Second annular groove
19 Second annular rib
20 Third annular groove
21 Step
22 Upper chamfer
23 Rounded corners
24 Radius
25 Transitional radius
26 Transitional radius
27 Bottom face
28 Projection
29 Annular groove
30 Pressure-measuring cell
31 Side wall
32 Radius
33 Diaphragm surface
34 Diaphragm outer surface
35 Support
36 Wall thickness

What is claimed is:

1. A method for manufacturing a pressure sensor comprising:
    providing a pressure transducer;
    providing a pressure-measuring cell having a pressurizable diaphragm; and
    manufacturing a transducer body in one piece using a metal powder injection molding process with a subsequent sintering process.

2. The method according to claim 1, wherein the metal powder injection molding process occurs at a pressure in the range of 150 to 1000 bar and a temperature in the range of 140 to 190° C.

3. The method according to claim 1, wherein the sintering process occurs at a temperature in the range of 1000 to 1400° C. and at ambient pressure.

4. The method according to claim 1, wherein, in the metal powder injection molding of the transducer body, an insert has pressure-tight injection molding applied around it and is sintered into the transducer body.

5. The method according to claim 1, further comprising producing an external thread on the transducer body for attaching the pressure transducer to a wall of a pressurized component.

6. The method according to claim 1, wherein the transducer body is configured with a hexagonal flange.

7. The method according to claim 6, wherein the hexagonal flange is configured with at least one of a first groove and a second groove.

8. The method according to claim 7, wherein transitions from a bottom of the groove to a wall of the groove of the first groove and the second groove take the form of radii.

9. The method according to claim 6, wherein in a side of the hexagonal flange facing a wall of a component into which the pressure transducer is screwed, a groove is formed, which forms a support that acts as an additional seal when the pressure transducer is installed in a pressurized component.

10. A pressure sensor comprising:
    a pressure transducer;
    a pressure-measuring cell having a pressurizable diaphragm; and
    a one-piece transducer body, the transducer body being manufactured in one piece using a metal powder injection molding process with a subsequent sintering process.

11. The pressure sensor according to claim 10, wherein the pressure-measuring cell is situated in the transducer body.

12. The pressure sensor according to claim 10, further comprising an insert for accommodating the pressure-measuring cell, the insert being situated in the transducer body.

13. The pressure sensor according to claim 12, wherein the pressure-measuring cell is joined to the insert in a form-locking manner.

* * * * *